UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

SULFITE-WASTE-LIQUOR PRODUCT.

1,311,220.

Specification of Letters Patent.

Patented July 29, 1919.

No Drawing.

Application filed November 13, 1917. Serial No. 201,807.

*To all whom it may concern:*

Be it known that I, CARLETON ELLIS, a citizen of the United States, residing at Montclair, in the county of Essex and State of New Jersey, have invented certain new and useful Improvements in Sulfite-Waste-Liquor Products, of which the following is a specification.

The present invention embraces a product produced by treating sulfite waste liquor by processes described and claimed in my copending applications 757,301 filed March 28, 1913 (now Patent No. 1,246,805) and 779,516 filed July 17, 1913.

In accordance with the process of the present invention, I take sulfite cellulose waste liquor as it comes from the digester or blow-pit of a sulfite pulp mill, and first heat the same to boiling, in its natural acid state, at which temperature it is maintained for a sufficient length of time to drive off the free sulfurous acid ($SO_2$ dissolved in the liquor). Some concentration of the liquor may be thereby effected. The liquor, after all (or the major part of) the free sulfurous acid has been driven off is still acid, due to the presence of sulfonic acid bodies, such as lignosulfonic acid and acid salts thereof. This acidity, which is not due to the presence of volatile acids, I refer to herein as the "fixed acidity" of the raw liquor.

I then preferably add an amount of lime or equivalent which is capable of reducing this acidity somewhat; in practice with ordinary liquor, I find it advisable to reduce the acidity about one-half. This step usually does not materially increase the calcium content of the liquor and may decrease this, since a precipitate of lime salts is produced thereby.

I may then further reduce the amount of lime in the liquor, if desirable for certain purposes, by the addition of soluble sulfates at this stage. Sulfates of aluminum, chromium, etc., may be used for this purpose.

The liquor is then evaporated to a solid state, this evaporation being effected at not much over 100° C., either by concentration in open pans (which may be placed on a sand bath if desired) or preferably by atomizing the liquor with currents of hot gases, particularly gaseous products of combustion, which gases will ordinarily be found to contain some free oxygen, but obviously much less oxygen than atmospheric air. This atomization may be carried out first to produce a concentrated liquor, and repeated one or more times until a dry product is produced. This product contains a part of the free acid of the original liquor, and is not to be confused with such a product as would be produced by entirely neutralizing the liquor, and then drying. Obviously the two products would not have the same properties.

The free oxygen present in the gases seems to oxidize unstable compounds in the liquor, thereby stabilizing the product, by what may be termed a "quick aging" process.

The volume and temperature of the gas current and of the liquor will preferably be so regulated that no overheating occurs, which would injure the product.

This dried product may be ground to a powder, and such product is stable, can be kept in wooden boxes or barrels for a long time without undergoing any marked change in solubility, appearance or odor.

This material is thereafter mixed with dry quick lime or dry slaked lime, and the mixture is relatively stable, when dry, and can be shipped or stored for weeks or even months, without material deterioration. It should be kept dry, that is it should not be kept out in the rain, nor stored in a very damp place, such as a damp cellar, since if it becomes wet, the liquor solids, which possess good binding properties, will be rendered insoluble. The mixture does not have to be kept in sealed containers and air of normal moisture content does not have any material effect thereupon.

If desired other pulverulent material may (either before or after storage or shipment to the place of use) be incorporated with the mixture, *e. g.* coal fines, ores, sand, sawdust, talc, asbestos, or any other material with which the sulfite liquor residue is to act as a binder. Such material may be present in amount equal to five to twenty times (more or less) the amount of the sulfite liquor solids, depending upon the use to which the material is to be put, and upon the manner in which the agglomerating or working of the product into shaped bodies is to be effected, degree of water-resistant properties desired in the product and various other factors.

If the bulking agent, or material to be bonded contains lime or equivalent material, this fact may be taken into consideration in proportioning the liquor solids and lime, in the first mixture.

The dry material is adapted to be employed for making shaped articles, for instance coal briquets, floors, columns, and particularly it may be worked up into finished shaped articles by the devices, machines and methods in use for the working of plastics.

This mixture of sulfite waste liquor solids of an acid character and lime is suitable for use as a binder, for making fuel briquets, or any other shaped products, and the filler to be mixed therewith (if the same be employed), and the particular mode of shaping the plastic mass will necessarily depend upon what specific shaped products are to be produced.

For this purpose it is, at the time of use, mixed with water to produce a pasty mass, the amount of water being variable within wide limits, depending on the nature of the filler or material which it is desired to bind together. An amount of water equal to 3 to 30 times the weight of the solids is frequently useful.

The water acting upon the mass of material, dissolves the liquor solids, which then react with the lime and produce an insoluble binder to hold the remainder of the material together. This action is not instantaneous, but requires usually at least a sufficient length of time for the pressing or shaping operations. Thus the lime acts as an "insolubilizing agent" for the liquor solids. The water to be mixed with the solid materials may carry any desired conditioning agents, to hasten or retard the setting, to further waterproof the product or otherwise increase its resistance to moisture or atmospheric influences, to modify the appearance (e. g. color) of the finished article, or to modify any one or more of the constituents of the mixture, including the constituents other than the waste liquor solids, e. g. the bulking agent. Sodium silicate solution is mentioned as such an addition, useful in some cases.

The insolubilization of the waste liquor solids by lime is a somewhat unexpected phenomenon, since sulfite liquor itself contains lime compounds and is readily soluble, but I have found that lime reacts with the liquor solids to produce an insoluble and even waterproof, water resistant combination. Coal briquets made by this treatment have been found to be sufficiently waterproof to stand out in the rain for days, or even weeks, without deterioration.

In place of lime, equivalent materials can be employed, any material capable of insolubilizing the sulfite liquor solids being to that extent an equivalent.

The present application is in part a continuation of matter disclosed in my copending applications 757,301, and 779,615, such applications disclosing the partial neutralization of the liquor (leaving the liquor somewhat acid) the removal of a portion of the calcium content of the raw liquor or partially concentrated liquor, the drying by atomization, and the mixing of lime or hydrated lime with the solids, to act as an insolubilizing agent for the liquor solids upon the addition of water to the mixture, and also the optional addition of sodium silicate, the shaping or molding operation as also the manufacture of shaped articles, such as coal briquets by the use of the herein described acid sulfite waste liquor solids and lime.

What I claim is:

1. A product comprising a dry admixture of soluble sulfite cellulose waste liquor solids of an acid nature and an insolubilizing agent therefor.

2. A product comprising a dry admixture of soluble sulfite cellulose waste liquor solids and lime.

3. A product comprising a dry admixture of only partially neutralized and dried soluble sulfite cellulose waste liquor solids and an insolubilizing agent therefor.

4. A product comprising a dry admixture of soluble sulfite cellulose waste liquor solids acid in character and an insolubilizing agent therefor, together with a bulking agent.

5. A dry mixture of acid solids of sulfite waste liquor and lime.

In testimony whereof I affix my signature.

CARLETON ELLIS.